Nov. 8, 1949   W. S. SOUTHWICK   2,487,392
CONTINUOUS WIRE FABRIC WELDER AND METHOD
Filed Feb. 7, 1948   11 Sheets-Sheet 1

INVENTOR
WILLIAM S. SOUTHWICK
BY Edgar H. Kent
ATTORNEY

Nov. 8, 1949 W. S. SOUTHWICK 2,487,392
CONTINUOUS WIRE FABRIC WELDER, AND METHOD
Filed Feb. 7, 1948 11 Sheets-Sheet 9

INVENTOR
WILLIAM S. SOUTHWICK
BY Edgar H. Kent
ATTORNEY

INVENTOR
WILLIAM S. SOUTHWICK

BY Edgar H. Kent
ATTORNEY

Patented Nov. 8, 1949

2,487,392

UNITED STATES PATENT OFFICE 2,487,392

CONTINUOUS WIRE FABRIC WELDER AND METHOD

William S. Southwick, East Lynn, Mass., assignor to Thomson Electric Welder Company, Lynn, Mass., a corporation of Massachusetts Application February 7, 1948, Serial No. 7,008

13 Claims. (Cl. 219—4)

My invention relates to a continuous wire fabric welder and to a method in which both the strand wires and the stay wires are automatically fed from coils and the wires electrically welded at their crossings. An object is to form the fabric at a greater speed than heretofore. Another object is to feed sets of at least three or more stay wires into the machine, cut the wires and feed the cut wires with the strand wires continuously to the welding point. Another object is to weld the stay wires to the strand wires by pairs of electrode discs which are free to rotate and are in engagement with and are rotated by the strand wires. Another object is to so guide the strand wires and the stay wires that they are kept straight in the machine. Another object is to form the welded fabric alternately into rolls of a predetermined length.

Figure 1:
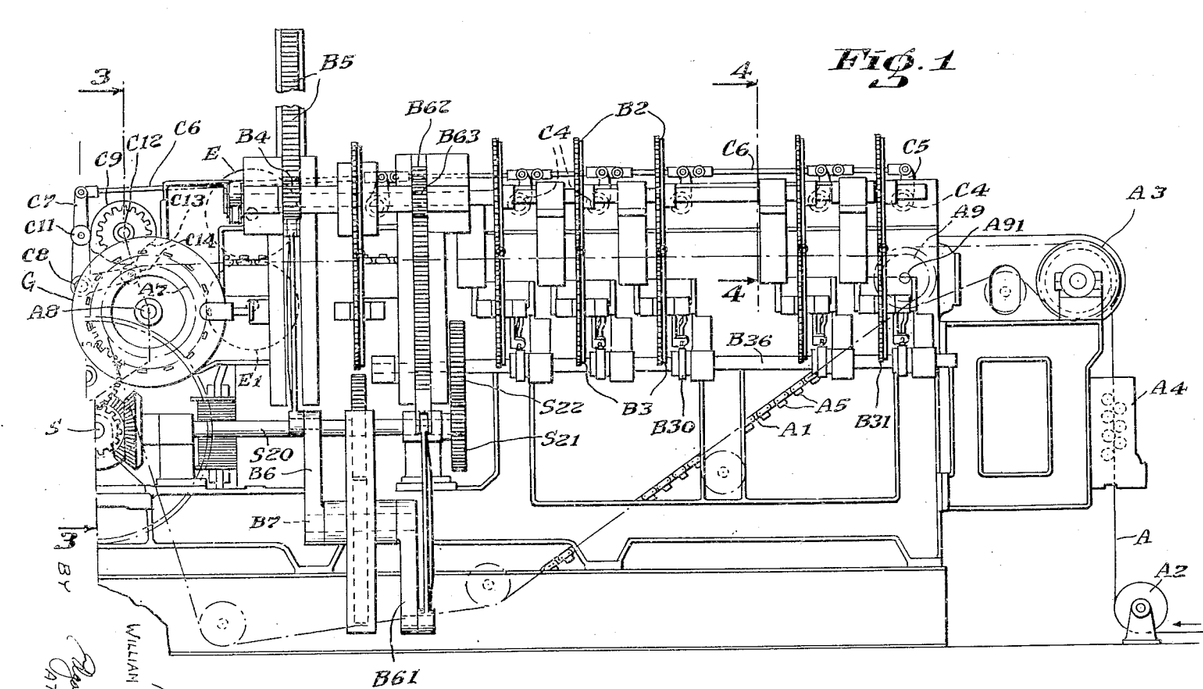
Fig. 1 is a side elevation of the forward part of the machine.

The strand wires A, Fig. 1, are drawn from coils, not shown, and after passing under a roll A2 at the front of the machine they pass through wire straighteners A4, which take out the kinks, and around wheels A3 each of which has a groove in which the wire passes around the wheel one or more times. The wheels are driven a little faster than the welded fabric is pulled by the draw wheels H, Fig. 1a, at the delivery end of the machine, whereby the tension on the wires is reduced.

Figure 2:
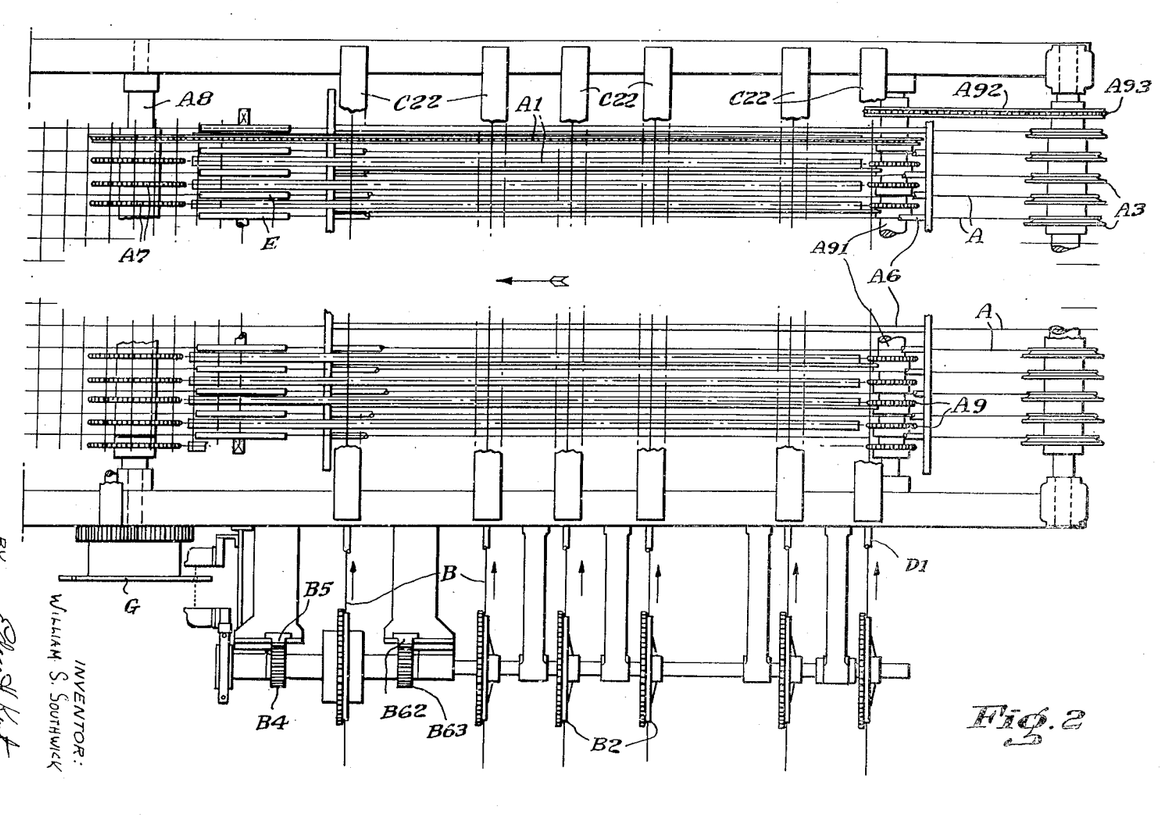
Fig. 2 is a plan view of the forward part of the machine.

Each wire is delivered into a tube A6, Fig. 2, which keeps the wire straight. Every other link of a chain A1, Fig. 1, is provided with a projection A5, between successive ones of which a stay wire is deposited. Each chain is driven from a sprocket wheel A7 fast on a driven cross shaft A8, Figs. 1 and 2, near the delivery end of the machine and pass under idler sprockets and over a guide sprocket A9 at the front of the machine.

Figure 3:
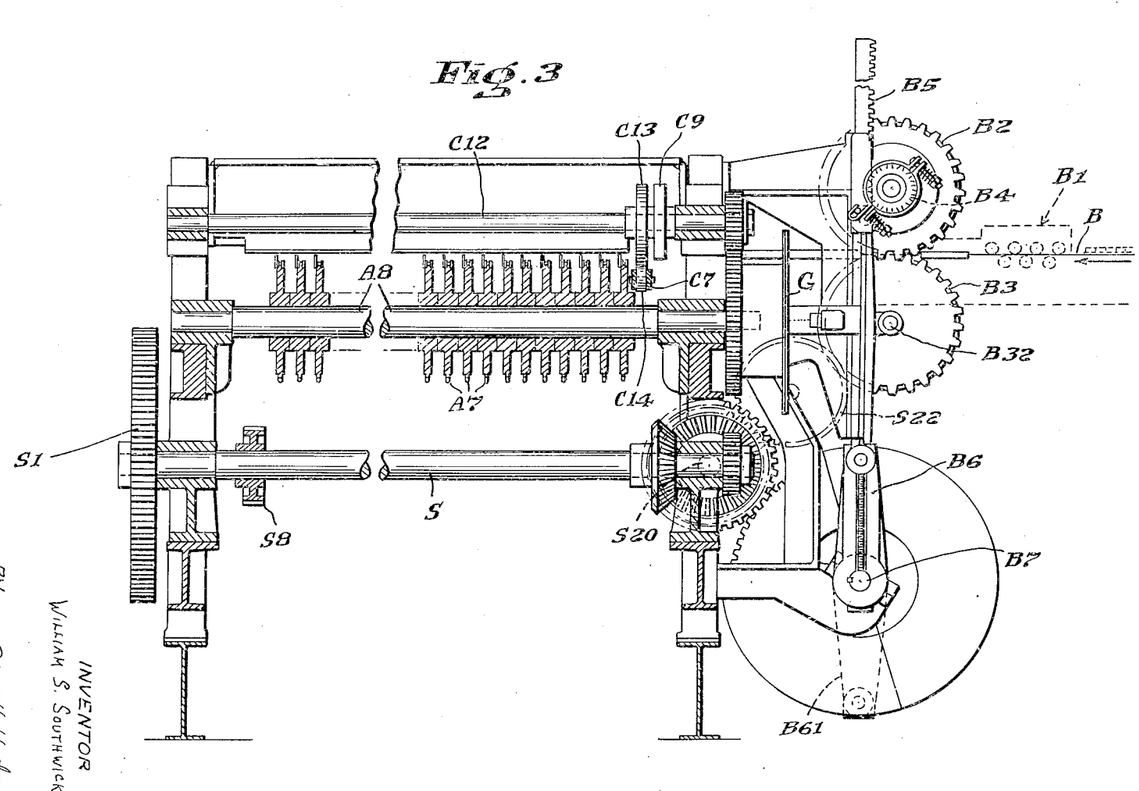
Fig. 3 is an elevation of a cross section of the machine on line 3—3 of Fig. 1.

Six stay wires B, Figs. 2 and 3, are fed in simultaneously from coils, not shown, through straighteners B1. Each wire is gripped between an upper and a lower ring, B2, B3. The rings are fastened to toothed wheels which loosely mesh with each other. Clutched to the upper wheel is a pinion B4 with which meshes a vertical rack B5 sliding in suitable guides. The rack is operated by a crank arm B6 on a shaft B7, Figs. 1 and 3, and, as the crank arm moves from bottom to top, it raises the rack and turns the ring B2 and by means of the toothed wheels the ring B3 to deliver a length of a stay wire. Just before the crank arm reaches top center, the ring B3 is lowered by a cam B30, Fig. 9, to disengage the ring B3 from the wire. The toothed wheel B31, to which the ring B3 is fastened, is mounted on a shaft B32 which is mounted in bearings B33 at the end of bell crank lever B34 pivoted to brackets on the frame. The end of the other arm of the lever carries roller B35 which is engaged by the cam B30 fast on the shaft B36. The lower wheel and ring are raised by a spring B37 soon after the crank arm B6 passes top center. As the crank arm moves from top to bottom it draws down the rack B5 but, as the rack operates on a one-way clutch connected to the ring B2, the downward movement of the rack does not turn the rings.

As the rack B5 moves down, another crank arm B61 on the shaft B7 turns from bottom to top and lifts another rack B62, Fig. 1, similar to B5, which, through another one-way clutch, turns a pinion B63 and rings B2 and B3 to insert another length of the same wire into the machine.

There are six sets of stay wire feeding rings and toothed wheels Fig. 1, all of which are operated by the above described mechanism to feed in a set of six wires simultaneously. The wires are spaced apart in the machine, shown, by 10 inches from the first to the second, 17½ inches from the second to the third, 10 inches from the third to the fourth, 10 inches from the fourth to the fifth and 17½ inches from the fifth to the sixth to space the stay wires 2½ inches apart, as they enter the welding wheel, hereinafter described.

Inasmuch as each of the several mechanisms for the insertion of the stay wires occupies so much space, it is necessary that they be spaced from one another further apart than the distance equal to the mesh length between adjacent stay wires of the finished fabric.

In the machine shown in the drawings, there are six such mechanisms and the distances from the first to the second, from the second to the third, from the third to the fourth, from the fourth to the fifth and from he fifth to the sixth are equal to 4, 7, 4, 4 and 7 mesh lengths, respectively. In this arrangement sets of six stay wires are inserted consecutively as the fabric is made.

It will be noted that the distances in mesh lengths from the first point of insertion to the second point, from the first to the third, from the first to the fourth, from the first to the fifth and from the first to the sixth are equal to 4 (i. e. 6 × 0 plus 4), 11 (i. e. 6 × 1 plus 5), 15 (i. e. 6 × 2 plus 3), 19 (i. e. 6 × 3 plus 1) and 26 (i. e. 6 × 4 plus 2) respectively. Thus the distances from the first point to any of the succeeding points, regardless of order, are equal to multiples of 6 plus any number from 1 through 5 without the repetition of any number.

Stated generally, the distances in mesh lengths from the first point to succeeding points of simultaneous stay wire insertions are equal, regardless of order, to multiples of the number of insertions plus any number, without repetition thereof, from 1 to the number of insertions minus 1 inclusive.

Figure 5:
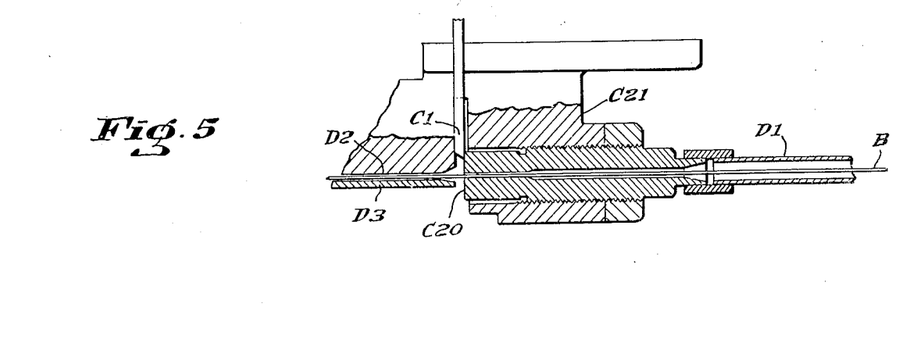
Fig. 5 is a detail of a stay wire cutter.
Figures 6, 7, 8:
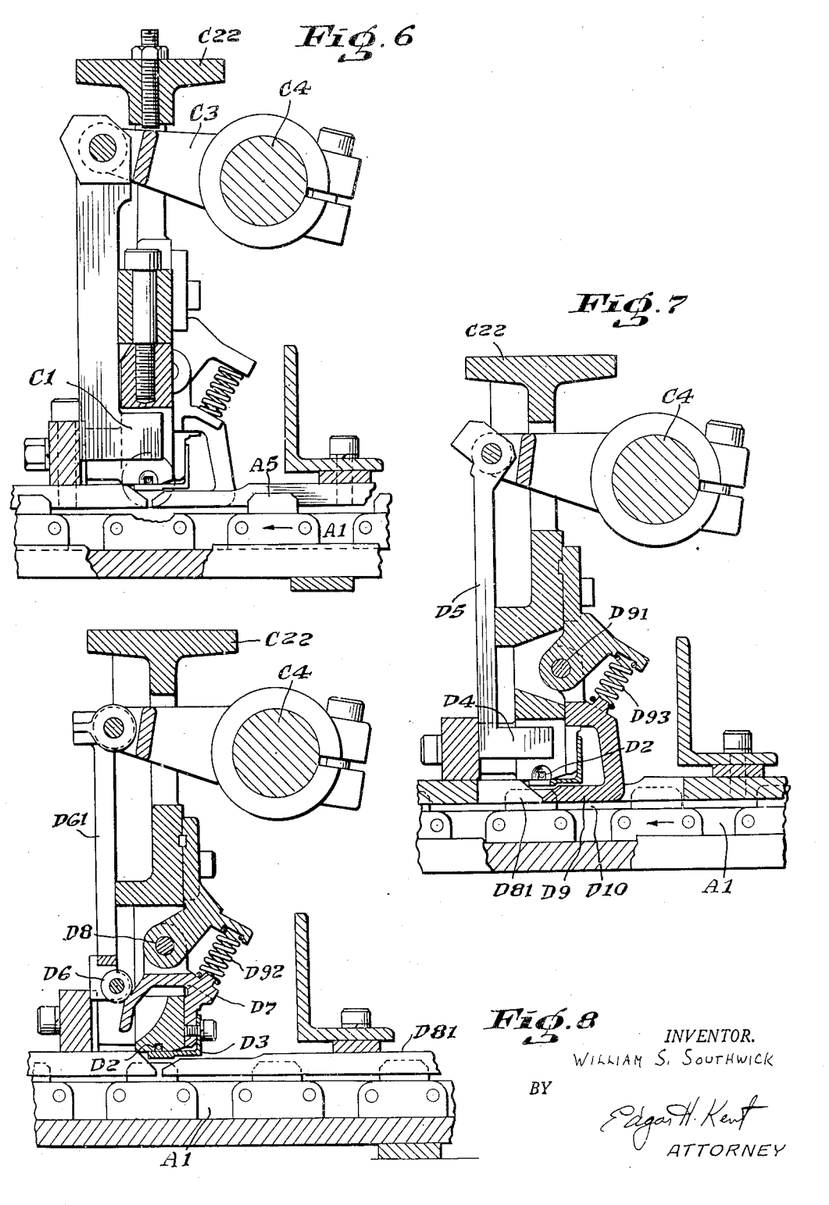
Fig. 6 is a view on the line 6—6 Fig. 4.
Fig. 7 is a view on the line 7—7 Fig. 4.
Fig. 8 is a view on the line 8—8 Fig. 4.

Each stay wire is cut as soon as it has been fed into the machine. A stay wire cutter, Figs. 4 and 5, consists of a movable top blade C1 and a lower stationary cutter C20. The top blade C1, Fig. 6 is on the lower end of a vertical bar which is operated by a crank arm C3 on a rock shaft C4, extending crosswise of the machine. The shaft C4 is rocked by an arm C5, Fig. 1, operated by a rod C6 pivoted to a lever C7 which is pivoted to a stud C8 on the frame. On one arm of the lever C7 is a roller C11 which is operated by a cam C9 on a shaft C12, Fig. 1. A cam C13, Fig. 3, on shaft C12, operates on a roller C14 on another arm of the lever C7, which rocks the lever in the reverse direction to move the rod C6, Fig. 1, forward and rock the shaft C4 to lift the cutter C1, Fig. 4. The lower stationary cutter, Fig. 5, is a plug C20 which is screwed into a bracket C21 attached to a girt C22, Fig. 4, on the frame so that the plug may be adjusted lengthwise of the wire B.

Figure 4:
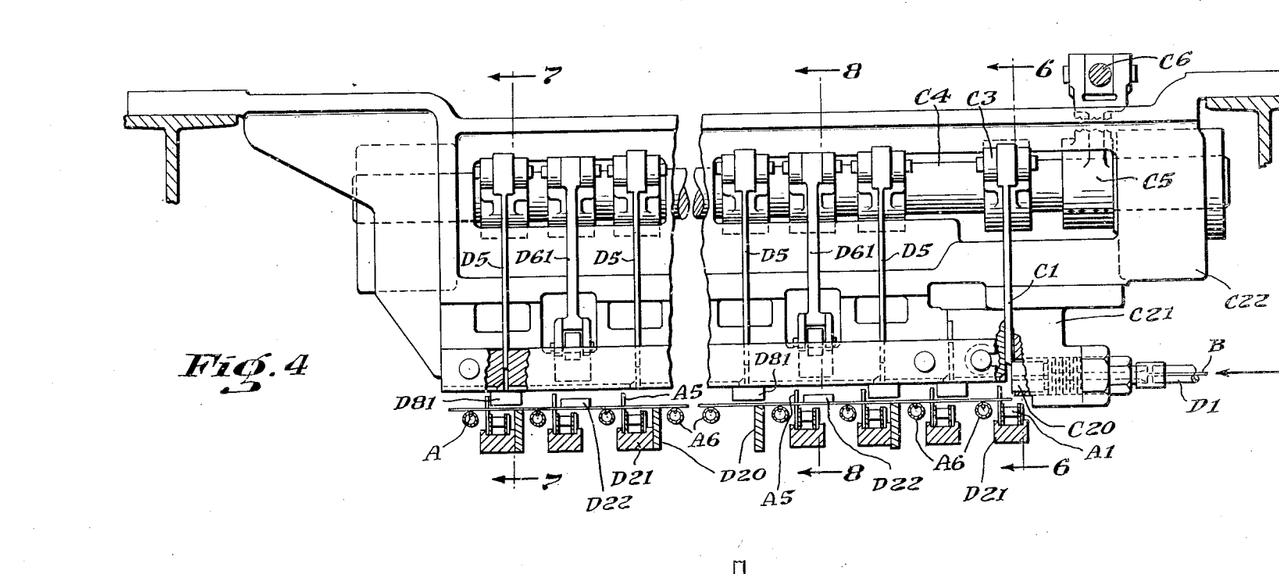
Fig. 4 is an elevation of another cross section of the machine on line 4—4 of Fig. 1.

Each stay wire B is inserted into a tube D1, Figs. 2 and 4, which guides it into the stationary cutter, from which it passes into a square groove or channel D2 in the bottom of the girt or cross member C22, Figs. 2, 7 and 8, extending across the machine. The wire is held in the groove by a gate D3, Fig. 8. The wire is pushed out of the groove by a pusher D4, Fig. 7, which moves in a slot in the girt C22. The pusher has an upward extension D5 which is pushed down by an arm to which it is pivoted, the arm being fast on the rock shaft C4. As the pusher descends, a roller D6, Fig. 8, on the end of a bar D61 pivoted to an arm fast on shaft C4, rocks a lever D7 pivoted at D8 on a casting attached to the girt C22, thereby withdrawing the gate D3 from beneath the groove D2. After the wire has been pushed from the groove D2 clear of the gate D3, the pusher, Fig. 7, pushes the wire into a V-shaped opening, one wall of which is the end of stationary bar D81 and the other wall D9 of which is movable, the latter being pivoted at D91 on a casting attached to the girt C22. Both the bar D81 and the wall D9 are located laterally between the projections A5 on the chains. As the wire is pushed down, it pushes against the movable wall D9, which is held by a spring D93 which yields to let the wire pass. The wire is pushed down between the projections on the chains A1 and, as soon as the wire passes the movable walls D9, they close to prevent the wire from rising up and hold it in the enclosure D10, and the roller D6, Fig. 8 ascends and the spring D92 closes the gate D3.

In order to prevent a stay wire from turning and moving lengthwise out of place, the wire rests at intervals on bars D20, Fig. 4 which are attached to the chain supporting bars D21 which extend lengthwise of the machine. On top of the wires at intervals rest short bars D22 which lie between the cross girts C22. The bars D22, located preferably midway between the bars D20, are held from movement lengthwise and sidewise, but are free to move vertically. These bars D22 press the wires against the bars D20 thereby preventing the wires from turning and holding them in place lengthwise so that they may be properly welded to the strand wires.

Figures 9, 10:
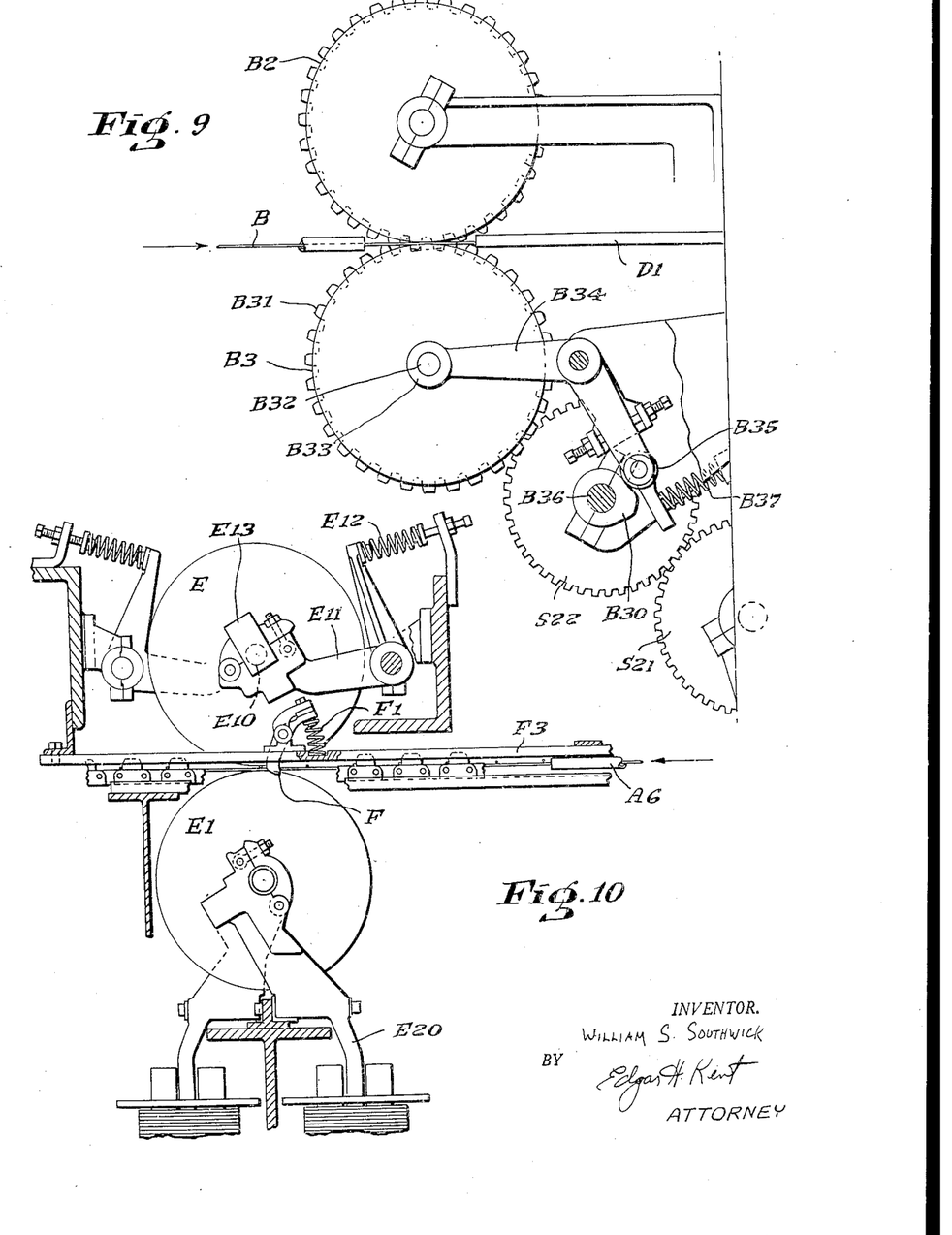
Fig. 9 is a view in elevation of the stay wire feed wheels.
Fig. 10 is a view in elevation of the welding wheels.

As the chains approach the welding wheels E and E1, Figs. 1 and 10, the stay wires are carried against latches F, Fig. 10, which are pivoted on brackets fixed to lengthwise bars F3 attached to a girt C22 and suitably to the frame. Each latch is held against a wire by a spring F1. The movement of the chains causes the latches to carry the wire back against the next projections on the chains thereby accurately locating the wire for the welding operation which next occurs. As the chains advance, the wire lifts the latches against the tension of the springs F1 which yield to let the wire pass.

For each strand wire there is a pair of welding wheels or discs E and E1 which are free to rotate and are driven by a strand wire. The current from the secondary leg E20 of a transformer passes into the lower wheel, through a crossing of a strand wire and of a stay wire, to the upper wheel of a pair, through arm E11, Fig. 10, through a flexible connection (not shown) to the adjacent arm E11, then to and through the upper wheel of the next pair, through the adjacent crossing of two wires and then into the lower wheel of the latter pair, from which it completes the circuit to the other secondary leg of the transformer.

The various electrically conducting parts are suitably insulated from the remainder of the machine. As this type of insulation is old and well known in the art, it need not be described here.

Each weld is completed in one to three cycles of a 60-cycle alternating current. The current is caused to flow through the primaries of the transformers by an electric eye device which comprises a rotating disc G on the shaft A8, Fig. 1. The disc has openings which register in succession with the beam of the electric eye. When the beam passes through an opening, it operates an electronic device which starts the current in the primaries and cuts it off at the end of the desired period. As the electric eye and the electronic device are well known and not part of my invention, no further description of them is necessary.

The upper welding wheel E, Fig. 10, is pressed against the lower wheel E1 to provide the necessary welding pressure. The wheel E has a central stud E10 projecting on each side of the wheel, which stud is rotatably mounted in a bearing E13 which is carried on one end of the arm of a lever E11 which is pressed by a spring E12 to press the upper wheel against the lower wheel with the welding pressure.

The latches F, Fig. 10, hold the wire against the projections on the chains as the welding starts.

Figure 1A:
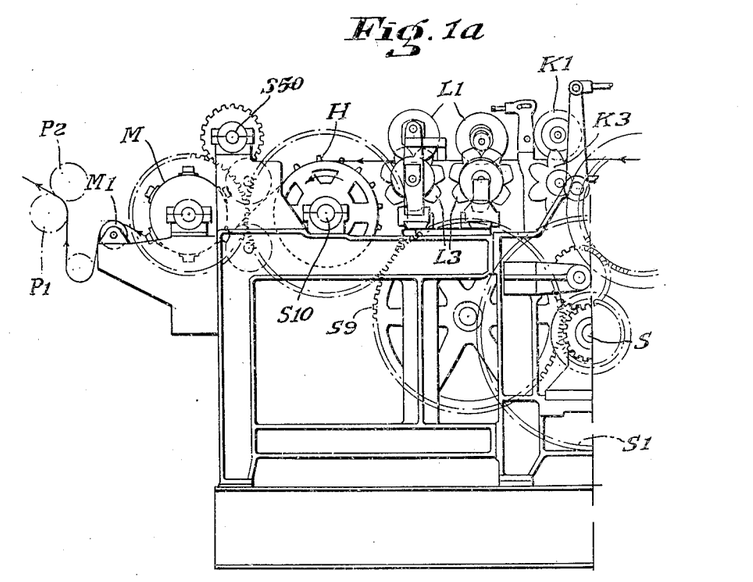
Fig. 1a is a side elevation of the rear part of the machine.

After the fabric is formed by the welding of the crossings of the wires, it is drawn onward by wheels H, Fig. 1a, which have projections which engage the stay wires and which pull the strand wires slightly faster than the speed of the chains A1 so that, as the chains pass over the sprockets of the wheels A7, the projections A5 on the chains will clear the stay wires and allow for possible stretch of the chains.

Figures 11, 12:
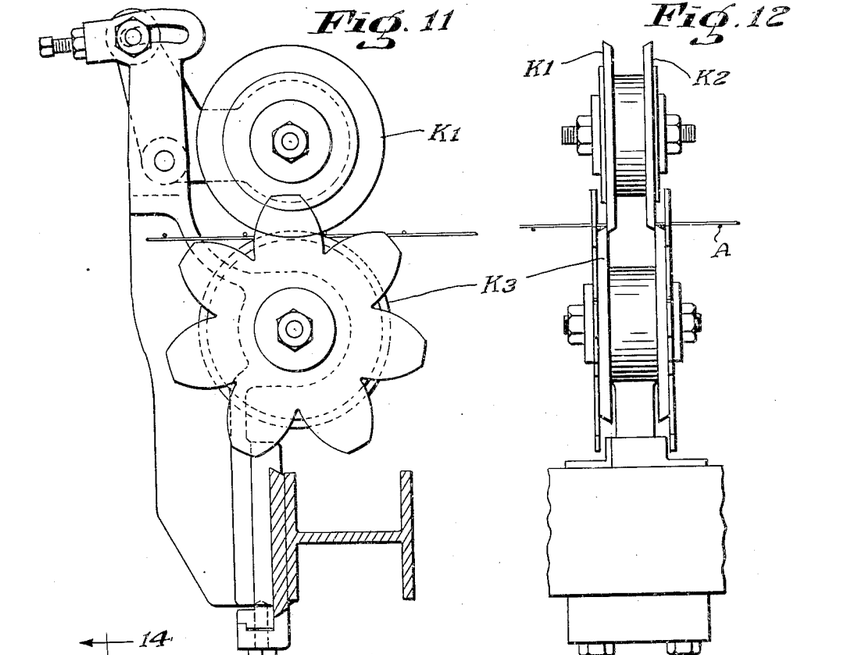
Fig. 11 is a side-view of the splitter.
Fig. 12 is an end view of the same.

When desired, the fabric is split by cutters, Figs. 1a, 11 and 12. A pair of rotary disc cutters K1 and K2 are mounted on a shaft. Each cutter cuts a stay wire against cutter wheels K3 to which are attached wheels having projections shaped to enter the successive spaces between the stay wires, thereby turning the cutter wheels K3. The cuts of the stay wires are made close to the strand wires.

If it is not desired to split the fabric, the cutters are removed from the machine.

Figures 13, 14:
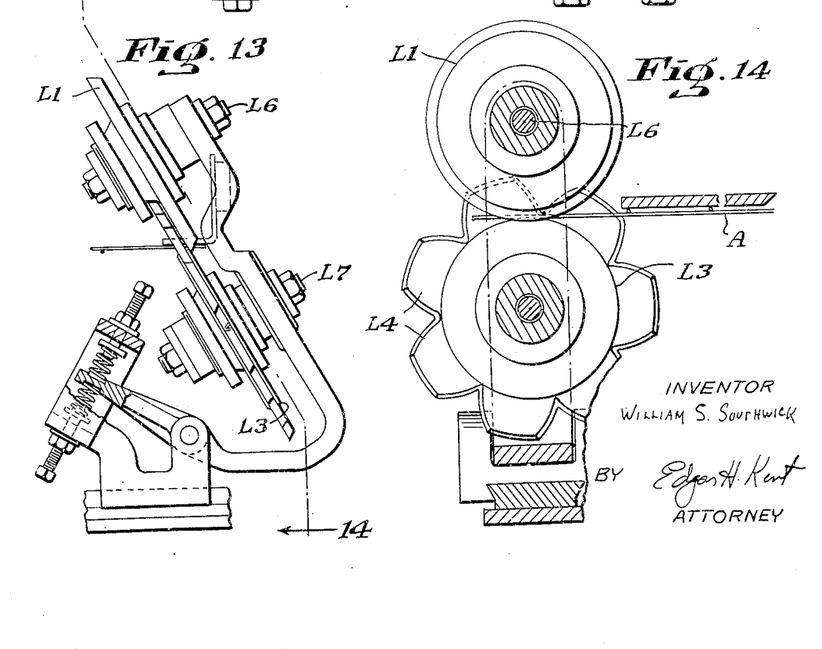
Fig. 13 is an end view of a trimmer.
Fig. 14 is a side view of the same.

The protruding ends of the stay wires on each side of the fabric are trimmed flush with the edge strand wires on an angle of about 60° to the fabric by rotary cutters L1, one on each side of the machine, Figs. 1a, 13 and 14. The edge strand wire is supported by an anvil in the form of a disc L3 to which is attached a wheel having projections L4 which enter the meshes of the fabric to turn the anvil wheel and the cutter L1. The wheel and the cutter are mounted on inclined stub shafts L6 and L7, so as to cut the projecting ends of the stay wires at an angle of about 60°. When the fabric is split, similar trimmers are mounted on the machine, to trim the protruding ends of the wires where the fabric has been split.

Figure 2A:
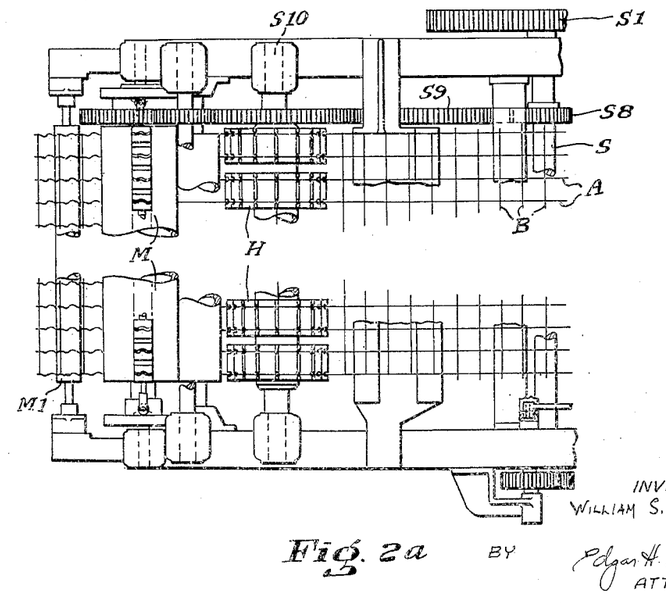
Fig. 2a is a plan view of the same.

The fabric then passes under a roller M, Fig. 1a, which has crimping devices in its surface which put crimps or bends into the strand wires, Fig. 2a. Thence it passes over a roller M1 and between rollers P1 and P2.

The main shaft S, Fig. 1a, has a gear S1 driven through gearing from a motor, not shown. Shaft S has a pinion, Fig. 1, which drives an idler gear which drives a gear on the shaft A8 to which are attached the sprocket wheels A7, Fig. 2, which drive the chains A1. The chains drive sprocket wheels A9 on a shaft A91, Fig. 1. Fast on shaft A91 is a sprocket which drives a sprocket chain A92, Fig. 2, which drives a sprocket A93 on the shaft to which are attached the tension reducing wheels A3.

A pinion S8, Fig. 2a, fast on the shaft S, drives a large idler gear S9, which drives a gear on the shaft S10, Fig. 1a, to which are attached the toothed wheels H which draw the welded fabric through the machine. The above gear on the shaft S10 drives a gear on the shaft to which the crimping roller M is attached.

The shaft S, through bevel gearing, Fig. 3, drives a shaft S20, Figs. 1 and 3, to which is attached a pinion which drives a gear attached to the shaft B7. For each half rotation of the shaft B7, the fabric is advanced six meshes, that is, the wheel H is turned to advance the teeth six spaces.

To the shaft S20 is attached a gear S21, Fig. 1, which meshes with a gear S22 fast on shaft B36, Figs. 1 and 9. The cams B30, which lower the lower wheels B3 of the stay wire inserting means, are fast on shaft B36.

In the machine shown the fabric is made at the rate of several, such as 70, feet a minute, and it is desirable to roll the welded fabric into rolls of 150 feet, first into one wind-up roll and then into another such roll, without stopping the machine. This requires that after a length of welded fabric has been formed the fabric should be cut, a roll completed and the fabric diverted to be made into another roll.

Figure 15:
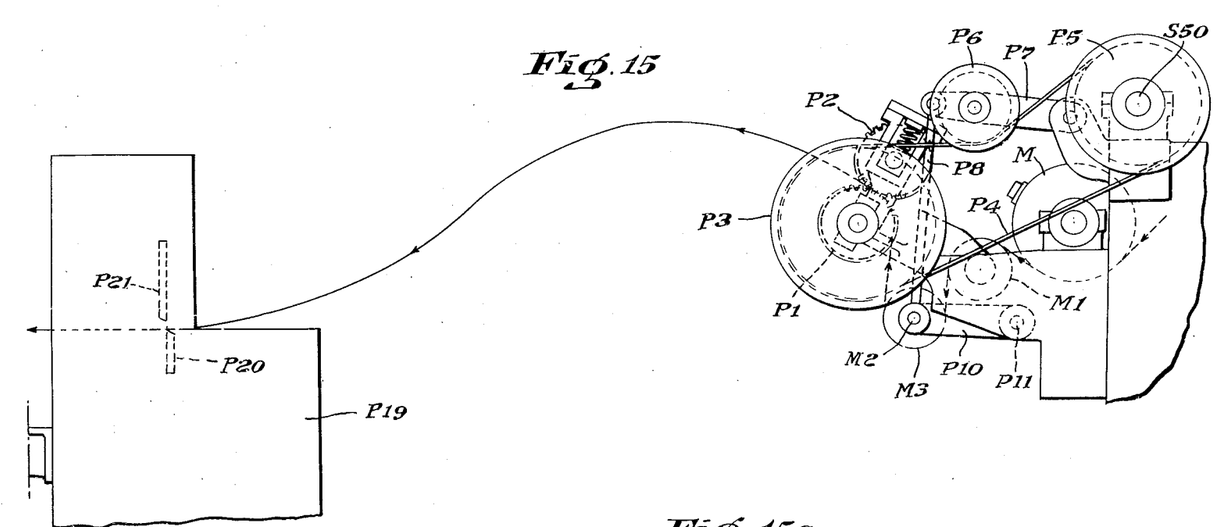
Fig. 15 is a detail of the rear part of Fig. 1a and a diagrammatical view of the strand wire cutter.

The welded fabric passes over a roll M1, Figs. 1a and 15, to the nip of a pair of pinch rolls P1 and P2. P1 is fast on a shaft journalled in brackets on the frame. P2 is mounted in a bearing which is urged by a spring to press the roll P2 against the roll P1. The shaft to which the roll P1 is fast has a pulley P3 driven by a belt P4 on a pulley P5 fast on the shaft S50.

An idler pulley P6 controls the tension of the belt P4. The pulley P6 is mounted on a stud on an arm P7 pivoted to a bracket on the frame. At the outer end of the arm is pivoted a link P8 pivoted at its lower end to a shaft M2 mounted in the ends of arms P10 fast to shaft P11 mounted in brackets on each side of the frame. The welded fabric passes under roller M3, on the shaft M2. When the feed of the pinch rolls is faster than the feed of the fabric, the latter lifts the roller M3 and the idler pulley P6 to relax the tension in the belt which then slips on the pulley P3.

From the pinch rolls the fabric passes to a cutter which has a lower stationary blade P20 and a movable upper blade P21, which moves up and down in guides. The lower cutting edge of the upper blade is inclined slightly so as to cut the strand wires in succession from side to side. The blade is lifted and lowered vertically by mechanism operated from a shaft which may be clutched to a shaft driven by an electric motor. As such a mechanism is well known and is not of my invention, I need not further describe it. The shaft S10, Fig. 1a, on which the toothed wheels H are fast, which draws the welded fabric through the machine, drives a counting device (not shown) which, on a predetermined number of meshes of the fabric, such as to give about 150 feet, closes an electric circuit which operates to throw in the clutch on the main shaft of the cutter and thereby causes the upper blade of the cutter to make one vertical reciprocation when the clutch is automatically unclutched. As this mechanism is well known and not of my invention it need not be further described.

Figure 15A:
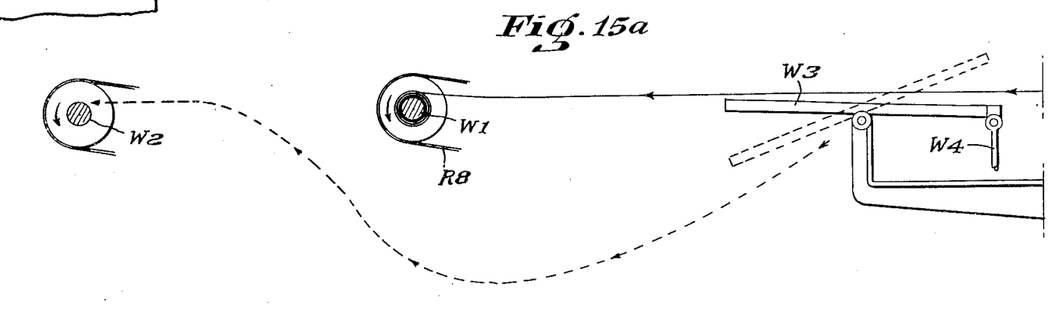
Fig. 15a is a diagrammatical view of the wind-up rolls and deflector plate.

The welded fabric passes the cutter station and is guided to either one of two wind-up rolls W1 and W2, Fig. 15a. Whether it goes to one or the other of these rolls depends on the angular position of the deflector-plate W3 pivoted at the end of brackets attached to the stand P19, Fig. 15, on which the fabric cutting mechanism is mounted. When the forward edge of the plate W3 is down, the fabric goes over the plate to roll W1, and, when it is up, the fabric is deflected below the plate and goes to the roll W2. To the forward edge of the plate is pivoted a link W4 the lower end of which is pivoted to the end of an arm W5, Figs. 16 and 17, pivoted on a stud shaft W6. Attached to the hub of the arm W5 is a disc W7. This disc has two notches 8 in its periphery diametrically opposite to one another. A spring pressed latch W81 is adapted to engage these notches and to hold the disc yieldingly in one of two positions.

Figure 16:
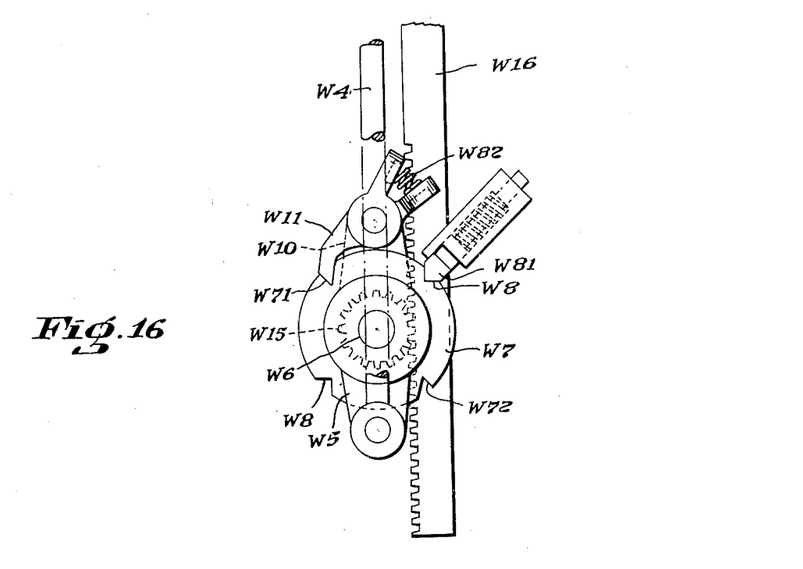
Fig. 16 is a side view of the mechanism operating the deflector plate.
Figure 17:
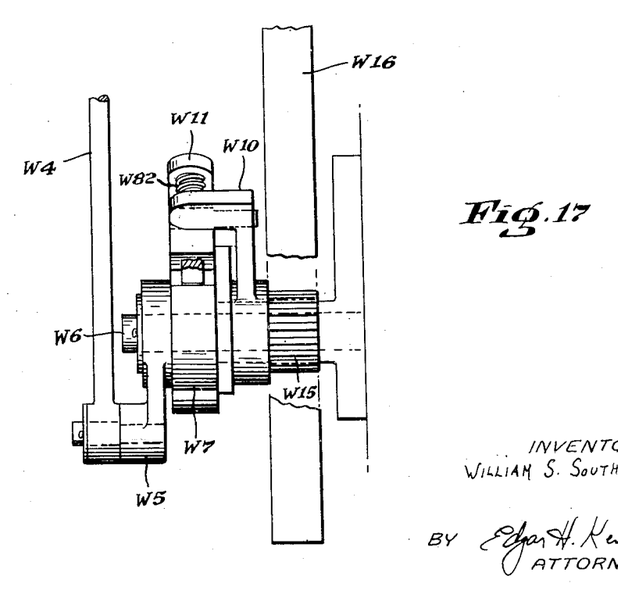
Fig. 17 is an end view of the same.

In the position shown in Figs. 16 and 17, the link W4 is down, and the fabric passes over the plate W3. Loose on the shaft W6 is an arm W10 to the end of which is pivoted a pawl W11, the end of which is pressed against the disc W7 by a spring W82 acting against a projection on the arm W10. The end of the pawl is adapted to enter notches W71 and W72 in the periphery of the disc W7. Attached to the hub of arm W10 is a pinion W15, with which meshes a rack W16 which moves up and down in slides and is operated by a connection to the upper blade P21, Fig. 15, of the fabric cutter. In the position of the parts, shown in Figs. 16 and 17, the blade P21 has completed its downward or cutting stroke. As it rises, the rack W16 turns the pinion W15 and the arm W10 carrying the pawl W11 anti-clockwise, Fig. 16, whereby the pawl W11, engaging the notch W71 of the disc W7, turns the disc anti-clockwise 180° and with it the arm W5 which raises the link W4 to tip the forward edge of the plate W3 up. This deflects the fabric under the plate W3 and directs it to the wind-up roll W2.

The machine continues to run until the counter causes the upper blade P21 to descend to cut the fabric. Then the rack W16 moves down and turns the pinion W15 clockwise, Fig. 16, to the turn the arm W10 clockwise 180° in which position the pawl W11 engages the notch W72 in the disc W7, the notch W72 having rotated 180° anti-clockwise to the position of notch W71 shown in Fig. 16. Then, when the cutter blade P21 rises, the rack W16 turns the pinion W15 anti-clockwise and with it the arm W10 and pawl W11 to rotate the disc W7 180°. This rotates the arm W5 180° from pointing upward to pointing downward and lowers the link W4 to lower the forward edge of the plate W3 thereby causing the fabric to pass over the plate and go to the wind-up roll W1.

When the blade P21 of the fabric cutter descends it stops the flow of the fabric until it rises. During this time, which is short, the fabric, held back by the blade, bulges upward, Fig. 15, as the pinch rolls continue to feed it onward. As soon as the blade rises the fabric straightens due to its resiliency, and resumes its progress to one of the wind-up rolls.

Figure 18:
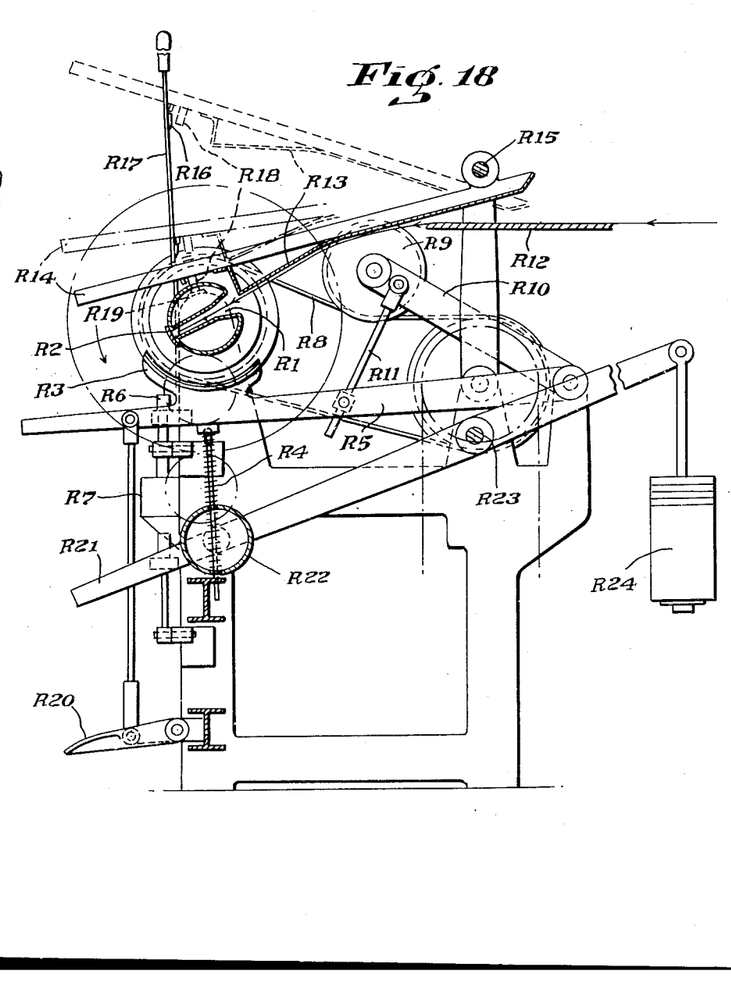
Fig. 18 is a side view of a wind-up roll mechanism.
Figure 19:
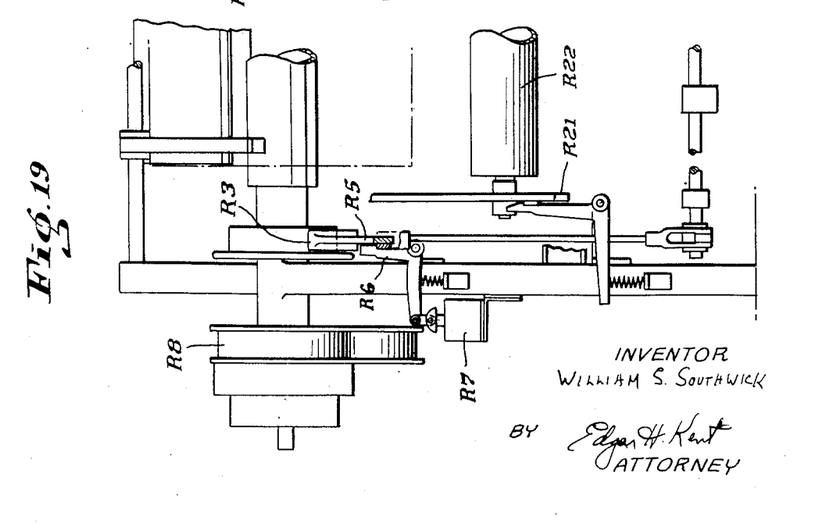
Fig. 19 is an end view of the same.

The wind-up operation is performed as follows, Figs. 18 and 19:

Each wind-up roll is made with a diametrical slot R1 into which the end of the fabric is to be inserted. The end of the slot is closed by a plate R2 attached to the halves of the roll to prevent the fabric from going through. When the wind-up roll is stationary, it is held in that position by a brake-shoe R3 which is pressed against the rim of a wheel fast on the shaft of the wind-up roll by a spring R4 which acts against a lever R5 on which the brake-shoe is mounted. The lever R5 is released by the operator from a latch R6 which is operated by a solenoid R7 when the operator presses a button to energize the solenoid. At the same time the belt R8 which drives the wind-up roll is relieved of tension by the raising of an idler roller R9 which bears against the belt and is maintained on the end of a lever R10 pivoted on a stud on the frame work of the machine. The lever R10 is connected to the lever R5 by a link R11 so that when the brake-shoe is applied, the lever R10 is raised and the idler roller R9 is lifted to relieve the tension on the driving belt R8, so that the rotation of the wind-up roll is stopped by the brake-shoe.

When the wind-up roll is stopped, the operator ties up the roll of fabric so that it will not fly apart. He then draws off the roll of fabric endwise from the wind-up roll. In order to draw off the fabric endwise, he first swings out of the way the bearing on which the half studs on the wind-up roll are mounted, such half studs being fastened each to one half of the wind-up roll. After removing the roll of fabric from the wind-up roll, the operator swings back the bearing to support the half studs.

The operator sees that the wind-up roll is stopped in a position in which the slot R1 faces in the direction of the approach of the fabric. The fabric approaches over a table R12 and is guided into the slot in the wind-up roll by a guide plate R13 which extends across the machine and is fastened to levers R14 which are fastened to a rock shaft R15 on the end of uprights on the frame. The levers R14 are held in raised position by a latch R16 which is attached to a spring arm R17 fastened at its lower end to the frame and engages a lug on the levers R14. The operator lowers the levers R14 by moving the spring arm to disengage the latch and moves the levers downward until a stop R18 on one of the levers contacts with a boss R19 on the frame whereby the guide plate R13 is so positioned so as to guide the fabric into the slot in the wind-up roll.

After the fabric has entered the slot, the operator raises the levers R14 so that the guide plate R13 is a short distance above its lowest position, so that the fabric is guided towards the top of the wind-up roll and is prevented from bulging upward adjacent thereto. If any bulge occurs it takes place further back in the feed of the fabric. The operator then steps on a treadle R20 to depress lever R5 to release the brake and tighten the belt R8 to start the rotation of the wind-up roll. After the wind-up roll has made a few rotations the operator unlatches a lever R21, pivoted at R23. The lever carries a roll R22 so that, as the roll rises due to the counterweights R24, it bears against the fabric as it is being wound on the wind-up roll. The operator raises lever R14 to its uppermost position to remove the plate R13 out of the way of the fabric as it is wound on the wind-up roll.

In operation the strand wires A, after having been straightened, are delivered to tubes A6 in which they are held from bending. A plurality, more than two, or set of stay wires B are fed simultaneously into the machine across and above the tubes while the strand wires continue to advance. A set of stay wires are fed every time the strand wires advance a distance equal to the length of a mesh of the welded fabric multiplied by the number of stay wires in a set. The stay wires of a set are cut off into lengths slightly greater than the width of the fabric. Each stay wire is fed into a channel with an open bottom in a cross girt C22 in which it is held by gates D3. After the wires are fed in and cut the gates are withdrawn and each stay wire is pushed down into a V-shaped opening one side D9 of which is forced to move by the wire in order to allow the wire to pass down onto the tubes and between the transverse rows of projections A5 on the chains A1, which travel between and parallel with the tubes. The projections carry the stay wires through the machine while the wires are held from upward deplacement by bars D22 which rest on the stay wires. The strand wires are advanced by the movement of the welded fabric and the stay wires are advanced by the movement of the chains until they are welded to the strand wires. When the strand wires advance beyond the ends of the tubes A6, the stay wires drop down onto the strand wires. As the strand wires and the chains continue to advance, each stay wire, before it comes to the welding position, is forced back by spring fingers F against a transverse aligned row of projections on the chains to position the stay wire accurately on the strand wires at intervals corresponding to the length of the mesh of the fabric. The advance of the strand wires between the disc electrodes E and E1 rotates the electrodes which are free to rotate. When a stay wire is carried into the nip of the electrodes, the welding current is on to form the weld as the upper electrode is pressed down with welding pressure against the lower electrode. The welding current is cut off after one to three cycles of a 60-cycle welding current. The welded fabric is advanced through the machine and the ends of the stay wires projecting beyond the outside strand wires are trimmed off. The fabric may be split and in such case the ends of the stay wires projecting beyond the strand wires at the cut edges are also trimmed. The welded fabric continues to advance and, after a predetermined length of fabric has been welded, it is cut across and the cut fabric is guided to one of two wind-up rollers W1 and W2. When the fabric is again cut after another predetermined length has been welded, it is guided to the other wind-up roller so that the fabric is alternately wound into rolls of the same length. The entire operation of the machine is continuous and automatic except that the operator starts and stops the wind-up rolls and removes the rolls of welded fabric thereupon.

I claim:

1. In a machine for welding wire fabric, the combination of means to feed continuously a plurality of parallel strand wires in a horizontal plane, chains having projections thereon and travelling between and parallel to said strand wires in said plane, means to feed simultaneously a set of stay wires across and over the strand wires and the chains at spaced intervals, said intervals, in the lengths of the spaces from an outside stay wire to the other stay wires of the set, being equal, regardless of order, to multiples of the number of simultaneously fed stay wires plus a number, without repetition thereof, from 1 to the number of stay wires so fed minus 1 inclusive, knives and means to operate said knives to cut the stay wires to equal lengths slightly greater than the width of the plurality of strand wires, gates to hold the stay wires above the chains, means to withdraw said gates, pushers to press the stay wires down between the projections on the chains when the gates are withdrawn, means to hold the stay wires down, latches to press the stay wires against aligned projections on the chains as the chains advance, pairs of electrode discs freely rotatable by their engagement with the strand wires, means to press yieldingly one member of a pair of electrodes against the other member of the pair, and means to pass welding currents through the electrodes and through the crossings of a stay wire with the strand wires, comprising electronic devices to start and stop the currents, to weld the stay wires in succession to the strand wires.

2. In a machine for welding wire fabric, the combination of means to feed continuously a plurality of parallel strand wires, chains having projections thereon and travelling between and parallel to said strand wires, means to feed a set of at least three stay wires across and over the strand wires and the chains at spaced intervals, knives to cut the stay wires to equal lengths corresponding to the width of the plurality of strand wires, gates to hold the stay wires above the chains, means to withdraw said gates, pushers to press the stay wires down between the projections on the chains when the gates are withdrawn, latches to press the stay wires against aligned projections on the chains, pairs of electrode discs freely rotatable by their engagement with the strand wires, means to press yieldingly one member of a pair of electrodes against the other member of the pair and means to pass welding currents through the electrodes and through the crossings of a stay wire with the strand wires to weld the stay wires in succession to the strand wires.

3. In a machine for welding wire fabric, the combination of means to feed continuously a plurality of parallel strand wires, chains having projections thereon and travelling between and parallel to said strand wires, means to feed a set of at least three stay wires across and over the strand wires and the chains at spaced intervals, knives to cut the stay wires to equal lengths corresponding to the width of the plurality of strand wires, gates to hold the stay wires above the chains, means to withdraw said gates, pushers to press the stay wires down between the projections on the chains when the gates are withdrawn, longitudinal bars and pivoted movable walls between the projections on the chains, said bars and walls forming the tops of spaces to enclose the stay wires, pairs of electrode discs, means to press yieldingly one member of a pair of electrodes against the other member of the pair and means to pass welding currents through the electrodes and through the crossings of a stay wire with the strand wires to weld the stay wires in succession to the strand wires.

4. In a machine for welding wire fabric, the combination of means to feed continuously a plurality of parallel strand wires, chains having projections thereon and travelling between and parallel to said strand wires, means to feed a set of at least three stay wires across and over the strand wires and the chains at spaced intervals, knives to cut the stay wires to equal lengths corresponding to the widths of the plurality of strand wires, pushers to press the stay wires down between aligned projections on the chains, latches to press the stay wires against said projections, pairs of electrode discs freely rotatable by their engagement with the strand wires, means to press yieldingly one member of a pair and means to pass welding currents through the electrodes and through the crossings of a stay wire with the strand wires to weld the stay wires in succession to the strand wires.

5. In a machine for welding wire fabric, the combination of means to feed continuously a plurality of parallel strand wires, a plurality of tubes through which the strand wires travel, chains having projections thereon and travelling between and parallel to said tubes, means to feed in succession a set of stay wires across and over the tubes and the chains at spaced intervals, knives to cut the stay wires to equal lengths corresponding to the width of the plurality of strand wires, gates to hold the stay wires above the tubes and chains, means to withdraw said gates, pushers to press the stay wires down onto the tubes between the projections on the chains when the gates are withdrawn, latches located beyond the ends of the tubes to press the stay wires against aligned projections on the chains, pairs of electrode discs freely rotatable by their engagement with the strand wires, means to press yieldingly one member of a pair of electrodes against the other member of the pair and means to pass welding currents through the electrodes and through the crossings of a stay wire with the strand wires to weld the stay wires in succession to the strand wires.

6. In a machine for welding wire fabric, the combination of means to feed continuously a plurality of parallel strand wires, chains having projections thereon and travelling between and parallel to said strand wires, means to feed a set of stay wires across and over the strand wires and the chains at spaced intervals, knives to cut the stay wires to equal lengths corresponding to the width of the plurality of strand wires, pushers to press the stay wires down between aligned projections on the chains, pairs of electrode discs freely rotatable by their engagement with the strand wires, means to press yieldingly one member of a pair of electrodes against the other member of the pair, means to pass welding currents through the electrodes and through the crossings of a stay wire with the strand wires to weld the stay wires successively to the strand wires.

7. A continuous wire-fabric welding machine comprising a plurality of continuous strand-wire feeders, a plurality of parallel strand-wire tubes lying in a horizontal plane, stay-wire feeders, parallel stay-wire receiving members having channels above and across said tubes, stay-wire cutters between said channels and stay-wire feeders, gates below and adjacent to openings in the bottoms of said channels, stay-wire lowering devices above said gates, continuously travelling stay-wire carrier-chains parallel to and between said tubes, and a plurality of pairs of welding wheels beyond the ends of said tubes, each pair engaging a strand wire.

8. The process of continuously making a welded wire fabric comprising continuously moving a plurality of parallel strand wires, equally spaced from one another, lengthwise in a horizontal plane, successively placing sets of the end portions of parallel stay wires in a horizontal plane above and across said strand wires, each of said sets containing the same number of at least three stay wires, successively severing each set of said end portions from the remainder of said stay wires into lengths equal to one another and slightly greater than the width of said plurality of strand wires, successively lowering each of said sets of stay wires, continuously carrying said stay wires laterally in the direction of the movement of said strand wires into positions equally spaced from one another upon said strand wires, and successively welding each of said stay wires to said strand wires at the crossings thereof.

9. The process of continuously making a welded wire fabric comprising continuously moving a plurality of parallel strand wires, equally spaced from one another, lengthwise in a horizontal plane, successively placing sets of the end portions of parallel stay wires in a horizontal plane above and across said strand wires, each of said sets containing the same number of at least three said stay wires, spaced from each other so that the distances in mesh lengths from the first stay wire to succeeding stay wires in a set are equal to multiples of the number of stay wires in a set plus any number, without repetition thereof, from 1 through the number of stay wires in a set minus 1, successively severing the end portions of the wires of each set from the remainder of said stay wires into lengths equal to one another and slightly greater than the width of said plurality of strand wires, continuously carrying said severed stay wires laterally in the direction of the movement of said strand wires into positions equally spaced from one another upon said strand wires, and successively welding each of said stay wires to said strand wires at the crossing thereof.

10. In a machine for welding wire fabric of a predetermined mesh length, the combination of means to feed continuously a plurality of parallel strand wires, and means, comprising a set of at least three mechanisms spaced apart at intervals greater than said mesh length, to feed a set of at least three stay wires across and over the strand wires at said intervals, said intervals, in the lengths of the spaces from an outside stay wire to the other stay wires, being equal, regardless of order, to multiples of the number of stay wires of the set plus a number, without repetition thereof, from 1 to the number of stay wires of the set minus 1 inclusive.

11. In a machine for welding a wire fabric, the combination of means to draw the welded fabric and a plurality of strand wires continuously through the machine under tension, means to feed a set of stay wires across and onto the strand wires at spaced intervals, welding means to weld the stay wires to the strand wires, grooved wheels located in advance of the welding means around which wheels the strand wires pass at least once and means to drive said grooved wheels at a peripheral speed faster than the feed of the welded fabric and the strand wires.

12. In a machine for welding a wire fabric, the combination of means to draw the welded fabric and a plurality of strand wires continuously through the machine under tension in a horizontal plane, means to feed a set of stay wires across the strand wires at spaced intervals, longitudinal bars to support the stay wires, bars extending longitudinally within said spaced intervals and adapted to rest on the stay wires, said bars being held from movement lengthwise and sidewise and being free to move vertically and welding means to weld the stay wires to the strand wires, whereby the stay wires in advance of the welding means are prevented from turning and are held in place lengthwise for proper presentation to the welding means.

13. In a machine for welding a wire fabric, the combination of means to draw the welded fabric and a plurality of strand wires continuously through the machine, means to feed a set of stay wires across the strand wires at intervals, welding means to weld the stay wires to the strand wires, trimming means to trim the protruding ends of the stay wires on each side of the fabric flush with the strand wires, said means comprising a rotary support provided with projections adapted to enter the mesh spaces of the welded fabric and to be rotated by the stay wires and a superimposed rotary cutting disc cooperating with the rotary support to trim the protruding ends of the stay wires.

WILLIAM S. SOUTHWICK.

REFERENCES CITED

The following references are of record in the file of this patent:

UNITED STATES PATENTS

| Number | Name | Date |
| --- | --- | --- |
| 1,448,566 | Muller et al. | Mar. 13, 1923 |
| 2,164,481 | Watkins | July 4, 1939 |
| 2,343,047 | Doyle et al. | Feb. 29, 1944 |
| 2,368,047 | Southwick | Jan. 23, 1945 |